United States Patent
Forstrom et al.

(10) Patent No.: US 7,079,904 B1
(45) Date of Patent: Jul. 18, 2006

(54) ADAPTIVE SOFTWARE MANAGEMENT

(75) Inventors: Howard Scott Forstrom, North Haledon, NJ (US); Edward Wojciechowski, Bloomingdale, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 215 days.

(21) Appl. No.: 10/660,768

(22) Filed: Sep. 12, 2003

(51) Int. Cl.
  G05B 13/02 (2006.01)
  G05D 17/00 (2006.01)
(52) U.S. Cl. ................................... 700/28; 700/291
(58) Field of Classification Search ............ 700/28–34, 700/36, 37, 44–47, 51, 52, 286–298; 713/300–330
See application file for complete search history.

(56) References Cited

U.S. PATENT DOCUMENTS

| | | | |
|---|---|---|---|
| 5,487,181 A | 1/1996 | Dailey et al. | |
| 5,560,024 A | 9/1996 | Harper et al. | |
| 5,794,137 A | 8/1998 | Harte | |
| 5,870,685 A | 2/1999 | Flynn | |
| 5,953,677 A | 9/1999 | Sato | |
| 5,991,883 A * | 11/1999 | Atkinson ................ | 713/300 |
| 5,999,830 A | 12/1999 | Taniguchi et al. | |
| 6,029,074 A | 2/2000 | Irvin | |
| 6,072,784 A | 6/2000 | Agrawal et al. | |
| 6,078,826 A | 6/2000 | Croft et al. | |
| 6,119,241 A * | 9/2000 | Michail et al. ........... | 713/322 |
| 6,208,846 B1 | 3/2001 | Chen et al. | |
| 6,212,645 B1 | 4/2001 | Tjandrasuwita | |
| 6,278,887 B1 | 8/2001 | Son et al. | |
| 6,317,614 B1 | 11/2001 | Okada | |
| 6,377,908 B1 * | 4/2002 | Ostrowski et al. ......... | 703/2 |
| 6,496,751 B1 * | 12/2002 | Salvo et al. ............... | 700/196 |
| 6,513,124 B1 * | 1/2003 | Furuichi et al. ........... | 713/322 |
| 6,519,552 B1 * | 2/2003 | Sampath et al. ........... | 702/183 |
| 6,556,992 B1 * | 4/2003 | Barney et al. ............. | 707/6 |
| 6,691,236 B1 * | 2/2004 | Atkinson ................... | 713/320 |
| 6,708,137 B1 * | 3/2004 | Carley ...................... | 702/179 |
| 6,915,172 B1 * | 7/2005 | Parent et al. .............. | 700/31 |
| 6,961,677 B1 * | 11/2005 | Boysworth ................ | 702/189 |
| 2003/0018450 A1 * | 1/2003 | Carley ...................... | 702/179 |
| 2003/0097197 A1 * | 5/2003 | Parent et al. .............. | 700/108 |
| 2004/0138858 A1 * | 7/2004 | Carley ...................... | 702/186 |
| 2004/0220842 A1 * | 11/2004 | Barney ..................... | 705/7 |

OTHER PUBLICATIONS

Howard S. Forstrom, et al, "Adaptive Software Management", U.S. Appl. No. 10/660,764, filed Sep. 12, 2003, 39 pages.

* cited by examiner

Primary Examiner—Maria N. Von Buhr
(74) Attorney, Agent, or Firm—Edell, Shapiro & Finnan, LLC

(57) ABSTRACT

Adaptive control techniques, such as power management techniques for use in managing power consumption in an electronic device, employ optimization analysis to generate power consumption/quality of service performance plots. The optimization analysis can include experiments that are performed for various settings of control factors that control the operation of the device. The performance plots relate power consumption in the device to quality of service levels for the device. During operation, aspects of the device are monitored. A control factor and a level for the control factor are automatically selected based on the monitored aspects, by using the performance plots to identify an experiment having the desired quality of service level and the corresponding control factor level. The control factor is then automatically set to that selected level to control the power consumption or quality of service of the device.

46 Claims, 11 Drawing Sheets

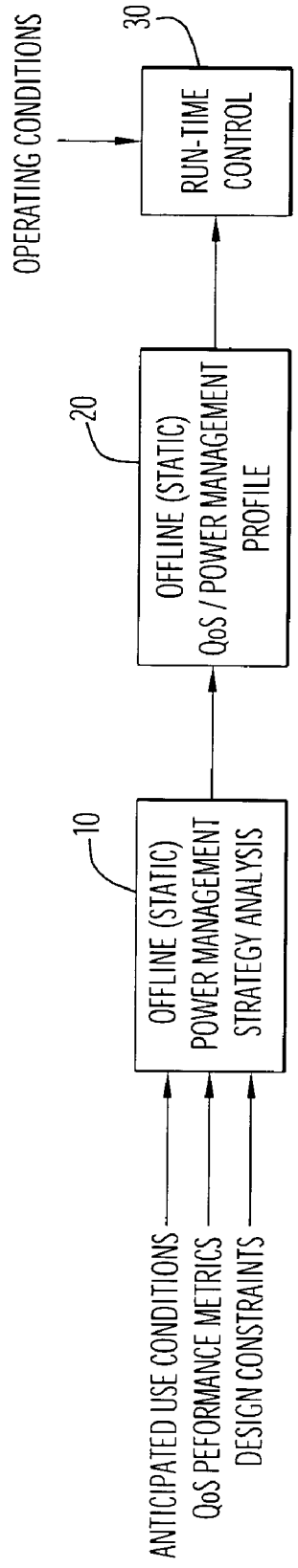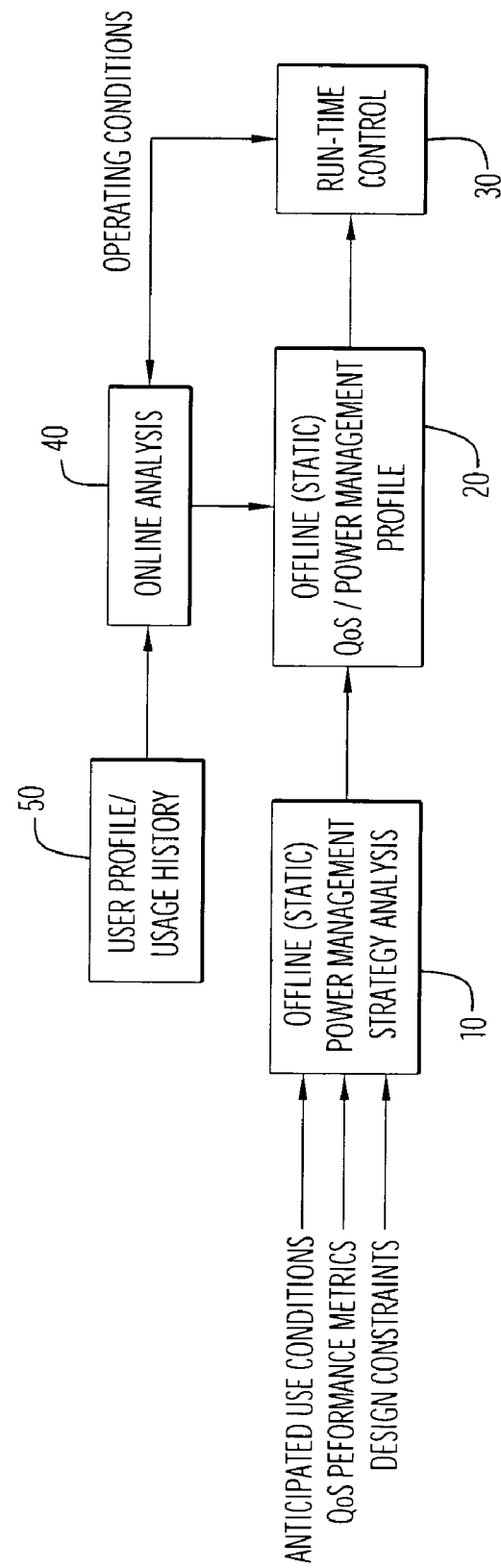

ADAPTIVE SOFTWARE MANAGEMENT

BACKGROUND OF THE INVENTION

1. Field of the Invention

The invention relates to adaptive control of electronic, electromechanical and mechanical devices. More particularly, it relates to techniques for managing devices that are controlled using computer software.

2. Description of the Related Art

Computer controlled systems and devices are ubiquitous in today's society and there has been a long-felt need to optimize their operation to adapt to the needs of the individuals who use them. One such class of devices in which adaptive control is needed is portable battery powered devices. With the proliferation of battery powered devices, power management has become critical to the success of such products. Power drain effects all aspects of operation: size, weight, battery life. Adequately managing power allows for use of smaller and lighter batteries, other advanced power technologies (e.g., fuel cells, etc.), and other alternative portable power sources, each of which can support longer periods of operation of the devices. Although power management can be accomplished according to many approaches, none are known that are adaptive to a user's patterns of use or robust enough to optimize the power management in the presence of noise.

Designers of today's electronic devices attempt to reduce power consumption by concentrating their efforts on reducing the power drain required by the device or by using background processing tasks to determine if certain subsystems within the electronic device can be powered down. These devices often are described as being adaptive, since they feed back to a power management algorithm information concerning the power usage of the device to determine new values for adjustable power settings. However, the degree of adaptability of those device is very low since they employ only a mere feed back loop that does not account for system noise or provide control in dynamic situations.

Accordingly, there is a need for power management techniques that take into account system noise, user preferences, and patterns of use of the device. Power management systems are but one class of systems that are in need of adaptive control techniques. Many other types of systems can benefit from adaptive control techniques.

SUMMARY OF THE INVENTION

Therefore, in light of the above, and for other reasons that will become apparent when the invention is fully described, an aspect of the invention relates to a method of generating information for adaptively controlling a device.

For example, the power consumption of a device can be adaptively controlled according to the methods described here. One such method includes performing an optimization analysis based on a quality of service and power consumption of the device, and a plurality of control factors for controlling the device. A power management profile is generated that relates to the quality of service and power consumption of the device based on results of the optimization experiment. The power management profile is used to automatically determine a control factor to adjust, and a level to adjust it to, to minimize power consumption or achieve a certain quality of service level.

The above features and advantages of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

BRIEF DESCRIPTION OF THE DRAWINGS

FIG. 1A is a block diagram illustrating a power management system using off-line adaptive software power management techniques described here.

FIG. 1B is a block diagram illustrating a power management system using both off-line and on-line adaptive software power management techniques described here.

DETAILED DESCRIPTION

Figure 2A:
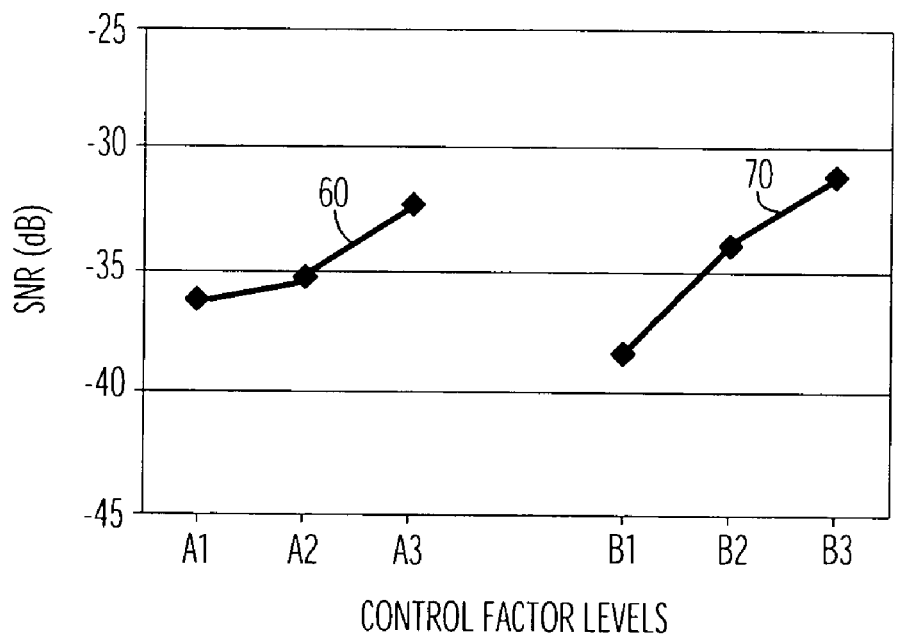
FIG. 2A is a graph showing the effects on a power consumption factor of a device, measured as a signal to noise ratio (SNR), as two control factors for that device are varied among different levels. The points on the graph are generated from experiments run on a system that uses a digital signal processor (DSP) as the object under test that operates in various modes and charting the resulting power consumption of the DSP measured as a signal to a noise ratio (SNR).

The embodiments described below are described with reference to the above drawings, in which like reference numerals designate like components.

The adaptive control techniques described here can be used in a wide variety of computer-controlled systems and devices. Virtually any system or device that is controlled by a computer and that is suitable for operating according to an individual operator's preferences or habits can benefit from the adaptive control techniques described here. For example, the adaptive control techniques described here can be applied to HVAC control systems, lighting control systems, home automation system, etc.

To illustrate the inventive techniques, embodiments that relate to power management are described here. For example, methods, devices and articles of manufacture are described here that can dramatically improve power management of electronic devices by optimizing the performance of the device in the presence of compound system noise. By using experiments, such as conventional Design of Experiments (DOE) experiments, Orthogonal Array experiments, Latin Square Design experiments, Taguchi style design of experiments, and full and fractional factorial style experiments, control factors can be chosen that control the device so that it performs in an optimal manner based on those chosen control factors, even in the presence of system noise. These experiments can be performed in an off-line mode to characterize the device's response for use when operating the device. Certain quality of service (QoS) performance metrics are selected to gauge the effect of changing a control factor, or design constraint. Anticipated use conditions, representing noise in the experiment, are factored into the experiments. The experiments are run resulting in a compilation of data that represents the effect on the QoS parameters as the control factors are varied, as well as the effect on power consumption. This data is analyzed to produce subsequent data typically in the form of plots and tables that describe how QoS varies as power consumption is varied, and vice versa.

A power management unit in the electronic device uses these QoS/power consumption plots during operation to manage the device's power consumption. The power management unit operates according to a power management strategy that is either predetermined or designated by a user. The power management unit monitors the relevant QoS parameters and the power consumption status. Based on the QoS/power consumption plots, generated in an off-line mode, the power management unit employs the selected strategy to vary a control factor to achieve a desired QoS or power consumption.

Alternatively, the QoS/power consumption plots can be updated in an on-line mode by monitoring the real-time QoS and power consumption, and performing the experiments and subsequent data analysis while the device is operating based on the measured QoS and power consumption data. In this manner, an on-line control of the device is achieved.

Off-line power management typically is performed at either the design or manufacturing stages of development to provide a product with "out of the box" power management. For some products, such as pagers, non-configurable items, or items used by different people, this is the only practical type of power management available. Other products that have processing capability can be customized by the user using an on-line power management technique. On-line power management is performed continuously in the background, adjusting various controllable settings to minimize the power usage of the product.

Off-line power management is appropriate to determine the initial/factory settings for power optimization for all products. For non user-configurable products, such as pagers or fire safety radios, where the user obtains equipment from a pool of radios, the off-line parameters would be used as the default power management settings and would be continuously monitored to provide either the best quality of service (QoS) or maximum battery life, depending upon the application.

In off-line power management, a series of analysis are performed that characterize the relationship between the static design parameters and desired output characteristics (e.g. QoS, power consumption, etc.). For battery powered devices these design parameters might include processor type, battery characteristics, RF settings, and option selection (back light, beep/vibrate, auto power down, etc). Output characteristics include, but are not limited to battery life, quality of service, brightness, and other features available to the user.

Once the optimal design settings are determined they provided a fixed, but minimized, power profile.

On-line power management provides for continuous monitoring, optimization and updating of the design settings to minimize the in-use power consumption. Optimization of these settings is based on previously identified factory criteria, user preferences and actual in-use conditions. For example, in a personal digital assistant (PDA) design, the off-line experiments might determine that a light sensor has a significant effect on the back light power consumption. The online system would monitor not only this static level relationship but also would allow for the user to specify the amount of back light requirement for his or her particular comfort level. Thus, the user can choose the best quality of service for his or her particular environment. Having specified a particular user constraint, the system can vary other parameters to ensure the appropriate level of service. Various features can be disabled based on the user selections.

As another example, a laptop computer writing to disk consumes a great deal of power. The on-line power management technique monitors the battery usage and changes the caching technique to reduce disk access. Although this raises the risk of lost data, the user can select his or her level of risk, based on the criticality of information being stored.

In yet another example, military, police or fire protection radio users who are issued a radio for long term use typically want to set custom features that are unique for their application. Such users want to have pre-set frequencies and menus to reduce the time that the display is operational. How and when the display is powered down is a factor in the on-line power management. The user may require the device to remain powered on for an eight (8) hour operational mission, and that requirement would be a major factor in determining the QoS that can be delivered. For instance, the radio user might select a typical percentage of expected voice, video and data traffic. The on-line monitoring can alert the user if the pattern of use does not agree with the request, and optionally make run-time decisions to meet the required eight (8) hour mission. Thus, instead of running out of power unexpectedly, the device can adjust the QoS or alert the user as appropriate.

Cell phone users typically want to set custom features that are unique the user's preferred style of using the cell phone. For example, cell phone users typically want to set the update frequency for the voice mail or roaming ping messages to locate a nearby transmission tower. Using the power management techniques described here, the user can choose a longer acquisition time to provide longer battery life.

FIG. 1A is a block diagram of an adaptive power management system for an electronic device, operating in an off-line mode to establish power management strategies that can be used to control the power consumed by the electric device. The system shown in FIG. 1A operates prior to using the electronic device, to establish in advance the power management strategies to be used in powering the device. In this manner, the power management strategies are generated off-line prior to using the device.

The off-line adaptive power management system includes an off-line power management strategy analysis unit 10. The analysis unit 10 includes software that performs off-line experiments to characterize various design constraints and QoS measures of the device. Inputs to the experiments include anticipated use conditions, QoS performance metrics, and various design constraints (or control factors) that are device dependent. By performing the off-line experiments, power management profiles are developed. An off-line QoS/power management profile unit 20 receives the results of the experiments and generates profiles based on those results. The generated power management profiles are stores in the off-line profile unit 20. The power management profiles held in the profile unit 20 are input to a run-time control unit 30 that controls the device based on the device's operating conditions and the power management profiles.

FIG. 1B is a block diagram of an off-line/on-line power management system. Here, an off-line power management strategy analysis unit 10 receives inputs that are similar to the inputs to the off-line power management strategy analysis unit 10 shown in FIG. 1A, namely, anticipated use conditions, QoS performance metrics, and design constraints. The output of the analysis unit 10 is provided to an off-line QoS/power management profile unit 20 that generates and stores power management profiles. Those power management profiles are provided to a run-time control unit 30 that operates and controls the device based on the power management profiles and operating conditions.

The off-line/on-line power management system shown in FIG. 1B also includes an on-line section. The on-line section includes an on-line analysis unit 40 and a user profile/usage history unit 50. The on-line analysis unit 40 operates to analyze in real time various constraints and parameters of the device based both on the real time operating conditions and based on user profile information or user history information from unit 50. The on-line analysis unit 40 outputs to the profile unit 20 information to update the power management profiles that are used by the run time control unit 30. This forms a control loop that adapts the power consumption to the actual operating conditions of the device and the user's patterns of use of the device.

FIG. 2A is a power-consumption/control factor effects graph. This graph plots certain control factors that affect the device's power consumption with respect to a QoS metric. These control factors can include different design constraints of the device. FIG. 2A illustrates two such control factors labeled "A" and "B." A first graph 60 shows the change in power consumption, measured as a signal-to-noise ratio in decibels (dB), of the device based on different levels for the control factor. In this case, factor A is varied among three levels, A1, A2 and A3. The design experiments are run by varying the control factor levels and measuring the power consumption for each level. For example, when factor A is set at a first level (A1), the device QoS measurement, namely a signal-to-noise ratio (SNR), it is measured at approximately −36 dB. When factor A is set to a second level (A2), the measured signal-to-noise ratio is approximately −35 dB. At the third level for factor A (A3) the signal-to-noise ratio is measured at approximately −32 dB.

An example of a control factor, labeled A in FIG. 2A, is an idle mode instruction in a digital signal processor (DSP) integrated circuit (IC). For example, a DSP manufactured by Texas Instruments, e.g., DSP model no. TMS320LC54x, has three power-down modes that can be set to control various states of dormancy for the processor. Each state disables certain functions of the DSP to reduce, by varying degrees, the power consumption of the DSP. By entering one of these power-down modes, the DSP will consume less than the amount of power consumed during normal operations. These power-down modes are often referred to as suspend modes or sleep modes. In this example, the DSP can be set to enter various dormant states by issuing, under software control, the instructions: IDLE_1, IDLE_2, or IDLE_3 instructions. Table 1 below shows portions of the DSP that are affected by these software commands.

TABLE 1

Low Power Operational Modes

| Operation | IDLE_1 | IDLE_2 | IDLE_3 |
|---|---|---|---|
| CPU Halted | Yes | Yes | Yes |
| Peripheral Clock Halted | No | Yes | Yes |
| PLL Halted | No | No | Yes |
| Data/Address State | No | No | No |
| External Control State | No | No | No |
| Internal HW Interrupts | No | Yes | Yes |
| External HW Interrupts | No | No | No |

Table 2 below shows two control factors: the IDLE mode instruction, labeled control factor "A," and the phase-lock loop (PLL)/clock rate in the DSP, labeled control factor "B." Table 2 shows three different levels to which each control factor can be set.

TABLE 2

Control Factor Levels

| Control Factor | Factor Label | Level 1 | Level 2 | Level 3 |
|---|---|---|---|---|
| Idle Mode Instruction | A | IDLE_1 | IDLE_2 | IDLE_3 |
| PLL/Clock Rate (MHz) | B | 100 | 50 | 25 |

As illustrated in FIG. 2A, if control factor A1 corresponds to the IDLE_1 instruction, A2 corresponds to the IDLE_2 instruction, and A3 equals corresponds to the IDLE_3 instruction, then FIG. 2A can be shows varying degrees of power consumption, measured as a signal-to-noise ratio in dB. For example, with control factor A1 selected (IDLE_1 instruction) the power consumption is less than when control factor A3 is selected (IDLE_3 instruction). In this manner, by performing experiments on the device with the control factors set to various levels, the plot shown in FIG. 2A is generated. This plot characterizes the quality of service of a device in relation to the various control factor levels.

Also shown in FIG. 2A is a second control factor, control factor B, set to various levels. Here, when control factor B1 is set, the device exhibits a power consumption, measured as a signal-to-noise ratio of approximately −38 dB. When control factor B2 is set, the power consumption is approximately −34 dB. When control factor B3 is set, the power consumption raises to approximately −31 dB. An example of a DSP control factor corresponding to control factor B is a frequency of a phase lock loop (PLL) circuit. That is, the PLL clock frequency, or speed, can be set to three different values in the DSP. That is, the PLL clock can be set to 100 MHz, 50 MHz, or 25 MHz.

A quality of service measure for this DSP example is a wake-up latency time of the DSP. The wake-up latency time is a measure of the amount of time required between commanding the DSP to exit an idle mode and the DSP being ready to operate in its normal mode of operation.

Table 3 below is a compilation of an exhaustive sequence of n-way experiments, varying each of the idle mode and PLL clock frequency control factors.

TABLE 3

Tabulated Results of Experiments that Varry Each Control Factors.

| Experiment No. | Idle Mode | PLL Clock (MHz) |
|---|---|---|
| 1 | IDLE_1 | 100 |
| 2 | IDLE_2 | 100 |
| 3 | IDLE_3 | 100 |
| 4 | IDLE_1 | 50 |
| 5 | IDLE_2 | 50 |
| 6 | IDLE_3 | 50 |
| 7 | IDLE_1 | 25 |
| 8 | IDLE_2 | 25 |
| 9 | IDLE_3 | 25 |

Table 4 shows the results of each of the experiments identified in Table 3.

TABLE 4

Experimental Results

| Experiment No. | Power SNR (dB) | Wake-up Latency (ms) |
|---|---|---|
| 1 | −40.2 | 0.00 |
| 2 | −40.1 | 0.00 |
| 3 | −35.0 | 0.14 |
| 4 | −35.7 | 0.00 |
| 5 | −34.5 | 0.00 |
| 6 | −31.8 | 0.09 |
| 7 | −32.4 | 0.00 |
| 8 | −31.2 | 0.00 |
| 9 | −29.7 | 0.07 |

Figure 2B:
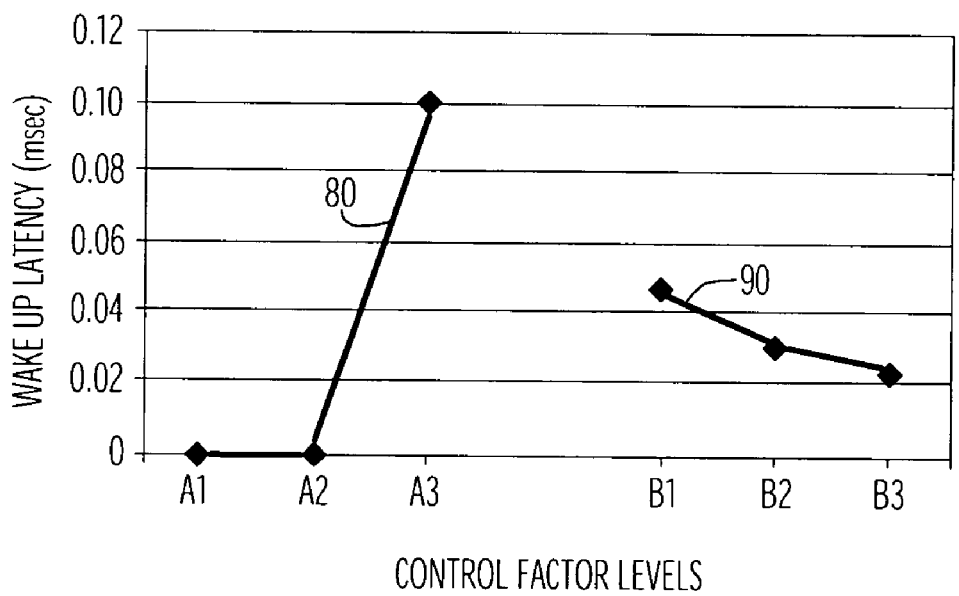
FIG. 2B is a graph showing the effects on a quality of service (QoS) attribute of a device, here, the wake-up latency of the DSP which has several states of suspended operation to conserve power, as the two control factors for the DSP are varied among different levels. The points on the graph are generated from experiments run on the DSP operating in various modes and charting the resulting wake-up latency of the DSP measured in milliseconds.
Figure 3A:
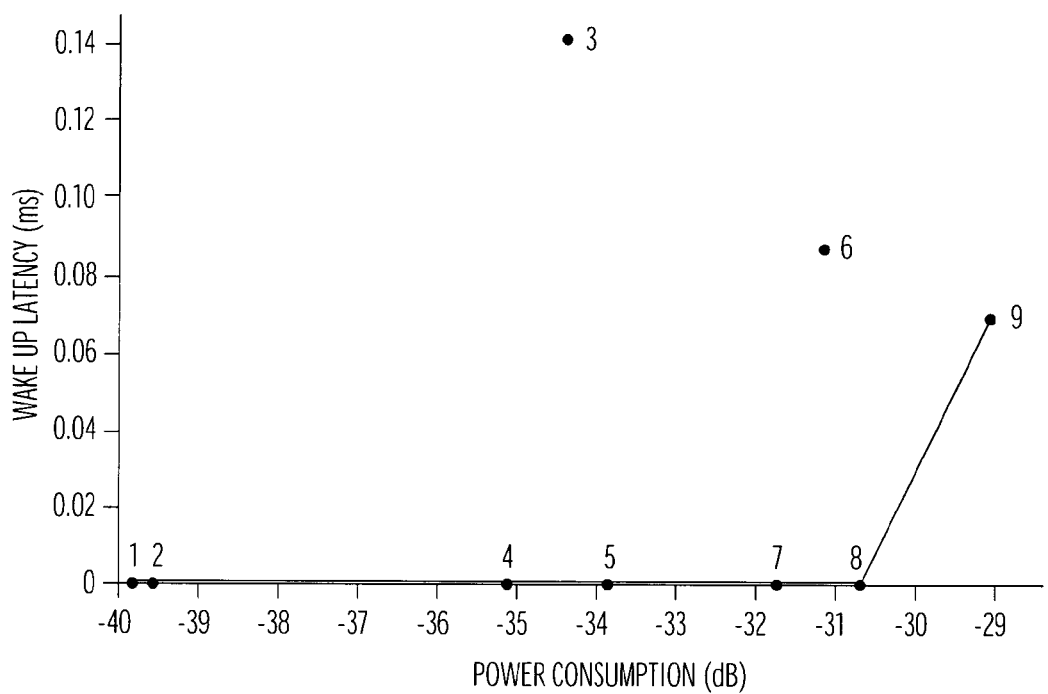
FIG. 3A is a graph illustrating a relation between a quality of service measure (i.e., wake-up latency) and power consumption of the DSP, generated based on the graphs of FIGS. 2A and 2B. The line connecting points 1, 2, 4, 5, 7, 8 and 9 indicates the optimal operating conditions that satisfy a QoS metric, in this case wake-up latency, while minimizing power consumption.
Figure 3B:
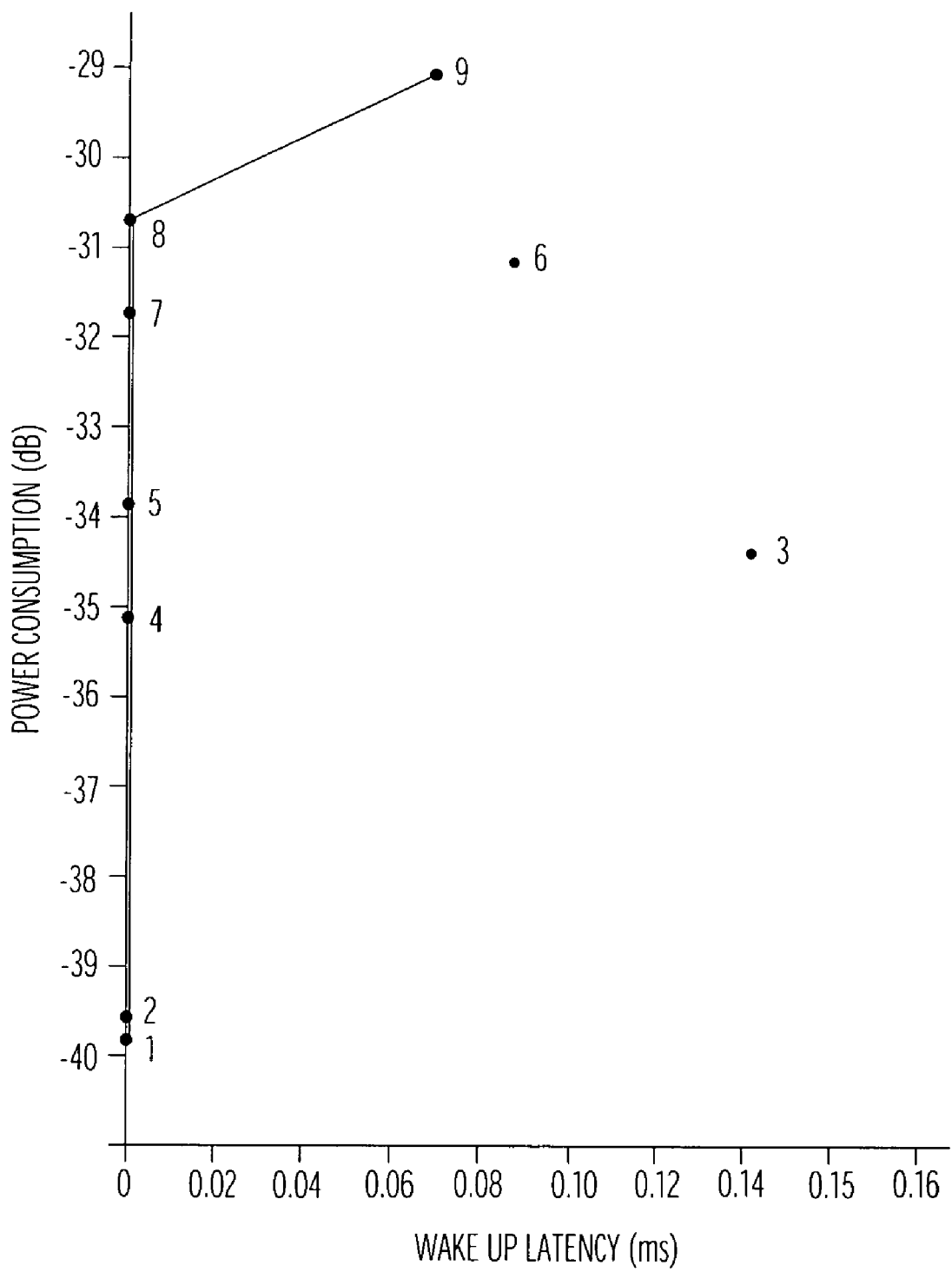
FIG. 3B is another view of the graph in FIG. 3A, illustrating a relation between power consumption of the DSP and the quality of service measure (i.e., wake-up latency), generated based on the graphs of FIGS. 2A and 2B.

The results from the experiments shown above in Table 4 are plotted in the graphs of FIGS. 3A and 3B. In FIG. 3A the graph 60 shows how power consumption changes when the idle mode instruction changes. Graph 70 shows how power consumption changes as the PLL clock frequency changes. In FIG. 2B, a graph 80 shows how the DSP wake-up latency changes as the idle mode control factor changes. Graph 90 shows how the DSP wake-up latency changes as the PLL clock frequency control factor changes.

FIG. 2B illustrates another measure of quality of service, namely, the wake up latency of the DSP. The wake up latency is measured in milliseconds (ms) and corresponds to the amount of time the DSP takes to exit a background thread to process an interrupt. Here, when control factor A1 is set there is virtually no latency. Similarly, when control factor A2 is set there is virtually no wake up latency. However, when control factor A3 is set a wake up latency of 0.10 milliseconds is experienced. Varying control factor B produces the following results: control factor B1 causes a wake-up latency of approximately 0.05 milliseconds; control factor B2 causes a wake-up latency of 0.03 milliseconds; and control factor B3 causes a wake-up latency of approximately 0.02 ms.

FIGS. 3A and 3B show a plot of the power consumption versus quality of service measures based on the experiments illustrated in FIGS. 2A and 2B. FIG. 3A shows a plot that relates the quality of service to the power consumption. FIG. 3B shows a plot that is the inverse of the plot shown in FIG. 3A. Namely, it illustrates a relation between power consumption and quality of service.

The QoS/power consumption charts produced from the experiments can be filtered to remove extraneous data points from the plots. This is illustrated in FIGS. 3A and 3B in which a curve is fitted to the data such that the data points corresponding to experiment numbers 3 and 6 are filtered out of the relation.

Another example of a QoS measure related to power consumption is the brightness of a display back light. In portable electronic devices that employ an liquid crystal display (LCD), a back light is often needed to enhance the readability of the display. However, using the back light can significantly decrease the life of batteries powering the device. Accordingly, users are often faced with a tradeoff in using the back light at the expense of depleting the charge on batteries that power the device. The adaptive power control techniques described here help manage the power in such a device having a back lit LCD display, while minimizing the drain on batteries powering the device.

Figure 3C:
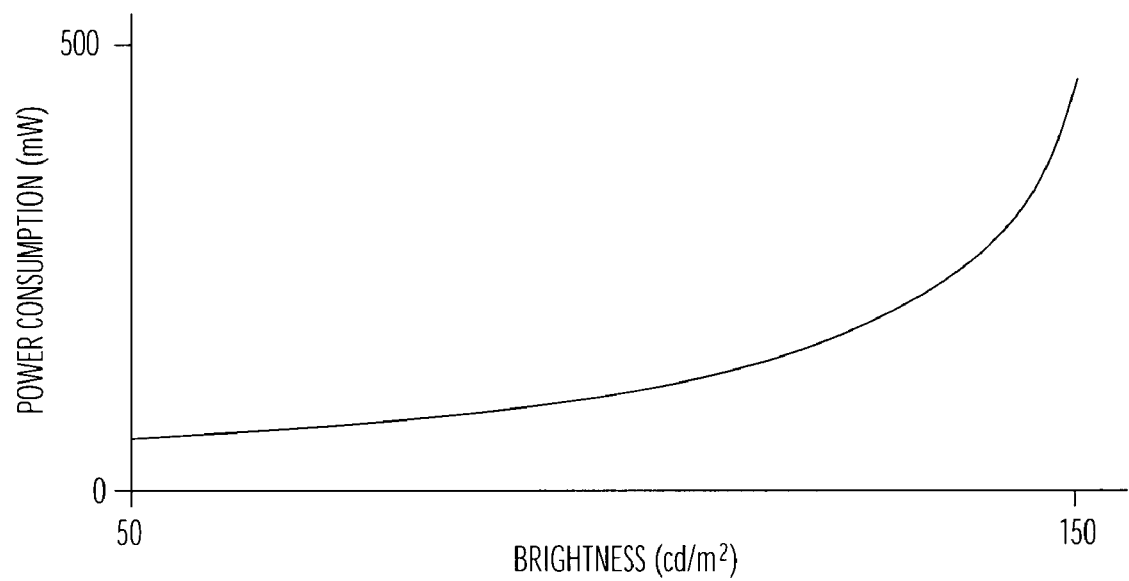
FIG. 3C is a graph illustrating example of another quality of service measure, namely, the brightness of a back light in a liquid crystal display (LCD) in relation to power consumption of the device employing the LCD.

FIG. 3C shows a curve fit to data points that would be experimentally produced that relate power consumption to the brightness of the back light display, measured in candles per square meter. Here, the graph illustrates that as brightness of the back light increases, the power consumption increases, almost exponentially. In this example, if the brightness control factor is desired to be 150 $cd/m^2$, the expected power consumption will be 500 mW.

Figure 3D:
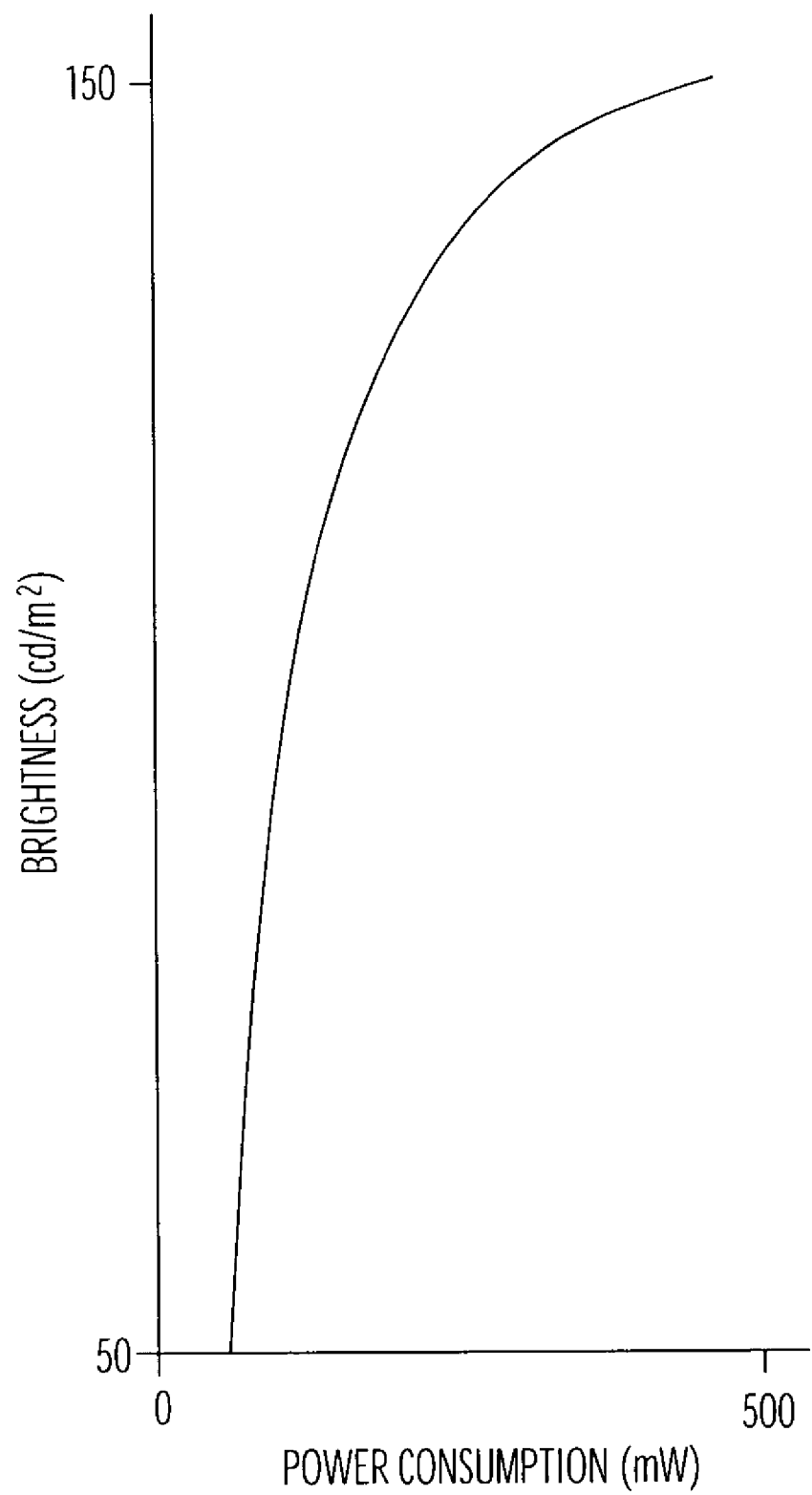
FIG. 3D is another view of the graph in FIG. 3C illustrating a relation between brightness of an LCD back light and power consumption of the device.

Similarly, the graph in FIG. 3D plots the same data points from the experiment, but relates back light brightness to the amount of power consumption. If a power consumption of 500 mW is desired, the resulting back light brightness will be 150 $cd/m^2$.

Figure 4:
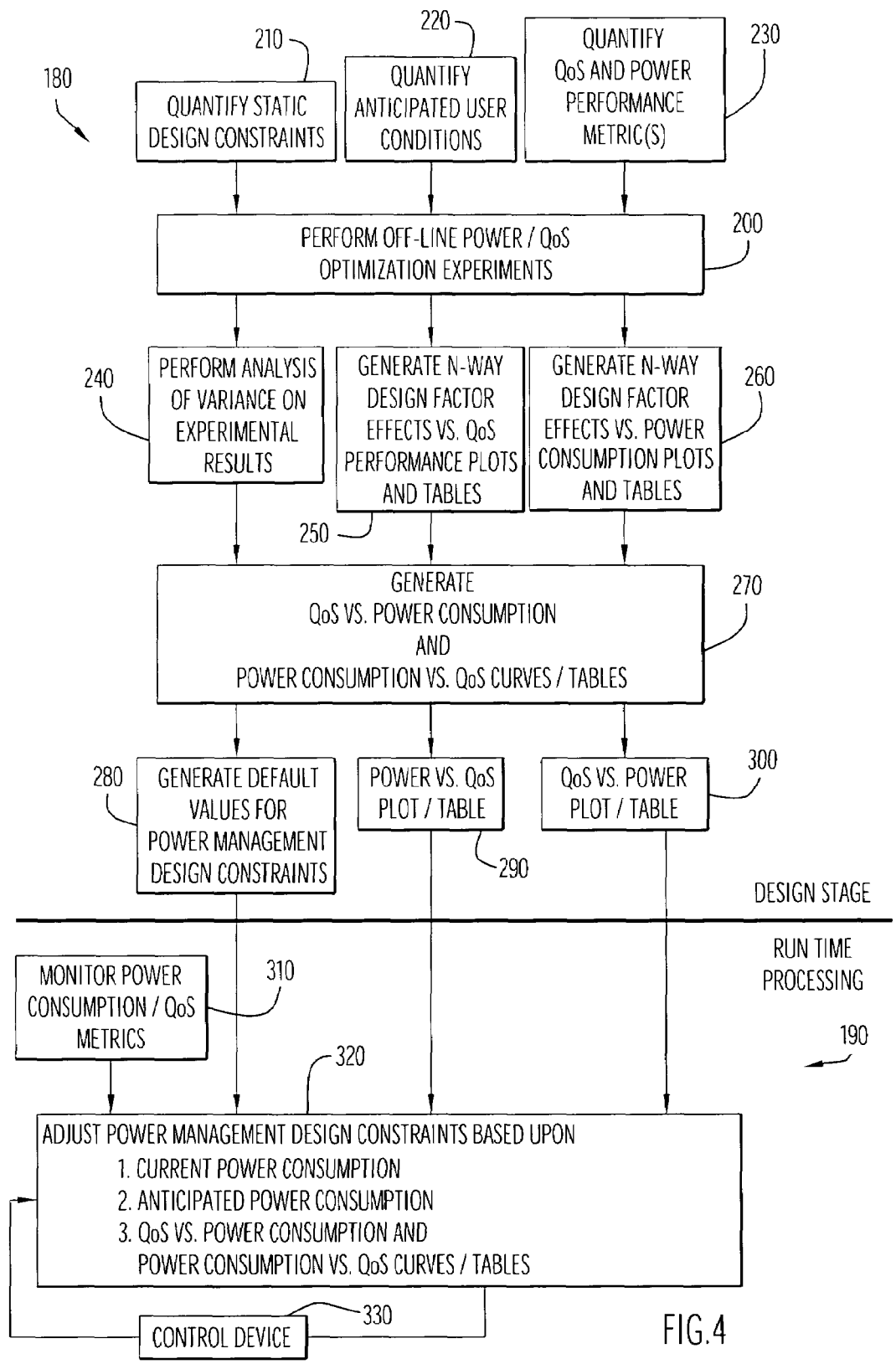
FIG. 4 is a block diagram showing the off-line adaptive power management system of FIG. 1A, in greater detail.

A block diagram of an offline adaptive power management system is shown in FIG. 4. The system is divided into two portions. The first is a design stage that relates to designing the power management strategies to be used in the device. It includes performing the offline power consumption/QoS optimization experiments and generating the QoS and power consumption graphs or tables for use in adaptively controlling the device.

The second portion of the device includes the run-time processing components. This portion operates with the device to monitor the power consumption and certain QoS metrics. That information is used together with the power consumption/QoS graphs generated offline to control the device based upon criteria a user designates as important, such as maximizing operation time, or ensuring a certain quality of service such as maintaining a certain degree of back light brightness.

Referring to FIG. 4, the design stage 180 includes performing optimization experiments 200 to optimize power consumption and quality of service measures. Examples of the type of optimization experiments are DOE experiments, Orthogonal Array experiments, Latin Square Design experiments, Taguchi style experiments, and full and fractional factorial style experiments, although it will be understood that other types of optimization experiments can be used. Prior to performing the experiments a power strategy designer must quantify static design constraints 210. At this stage, a designer determines the design constraints that can be used as control factors to the control the device to effect the appropriate quality of service. For example, design constraints, or control factors, that affect both power consumption and a quality of service parameter of interest are selected. In the example of the DSP, the design constraints that are chosen include the DSP's idle mode instructions and adjustable PLL clock speeds. Here, engineering judgement is exercised to select the most appropriate design constraints for the particular device to be controlled.

At stage 220, the designer specifies and quantifies anticipated user conditions. Here, the designer specifies how target users most likely will use the device in practice. For example, if the intended users primarily will be operating the device in a low-light environment, the designer can specify an anticipated use condition as one of a low-light environment.

In stage 230, the designer specifies and quantifies the appropriate quality of service and power performance metrics. Here, the designer identifies and characterizes the quality of service and power metrics according to an application of the device. For example, if the device is a radio for use in a military field operation, a long power life would be designated as having a high priority to ensure the radio can be powered while in the field for an extended period of time. However, the voice quality need only be set to have a discernable quality. Another application of the same radio might have different QoS and power performance metrics. For example, if the device is used in a firefighter's radio, long battery life extending over several days might not be as important as high voice quality.

These three inputs are supplied to the power/QoS optimization experiments in stage 200. Here, any of a variety of well-known optimization experiments can be employed, such as Taguchi experiments; fractional factorial experiments; full factorial experiments; DOE experiments, Orthogonal Array experiments, Latin Square Design experiments, etc. The optimization experiments generate experimental data upon which a variance analysis 240 is performed, for use in characterizing the data. In stage 250 n-way plots and/or tables are generated of the relation between the control factors and the QoS metrics, similar to the plot shown in FIG. 2B. Similarly, in stage 260, the resulting data from the experiments is used to produce an n-way plot or table of the relation between the control factors and power consumption, similar to the plot shown in FIG. 2A.

Stage 270 generates the QoS versus power consumption plot, and the power consumption versus QoS plots, such as the plots shown in FIGS. 3A and 3B, respectively, and FIGS. 3C and 3D, respectively. At stage 270 the experimental data is also filtered to remove any outlying data points. A smooth curve is fit to the data to characterize the power consumption versus QoS plot, which is made available in stage 290. Similarly, a smooth curve is fit to the data to characterize the QoS versus the power consumption plot and is made available in stage 300.

Based on the QoS and power consumption data generated in stage 270, default values of the power management design constraints are generated in stage 280. These default design constraints, or control factors, are set for use with the device.

The run-time processing portion 190 of the system is illustrated in FIG. 4. The outputs from the design stage, namely, the default control factor values, and the power and QoS plots and/or tables, are input to a power management unit for the device. The device, in stage 310, monitors the device's power consumption and QoS metrics. Here, the power management control factors, or design constraints, are adjusted in stage 320 based on the monitored power consumption and QoS metrics, and based on the power consumption versus QoS plot/table from stage 290 and on the QoS versus power consumption plot/table 300. The adjusted control factors are then used to control the device in stage 330. The adjustment/control stages continue during operation of the device.

Figure 5A:
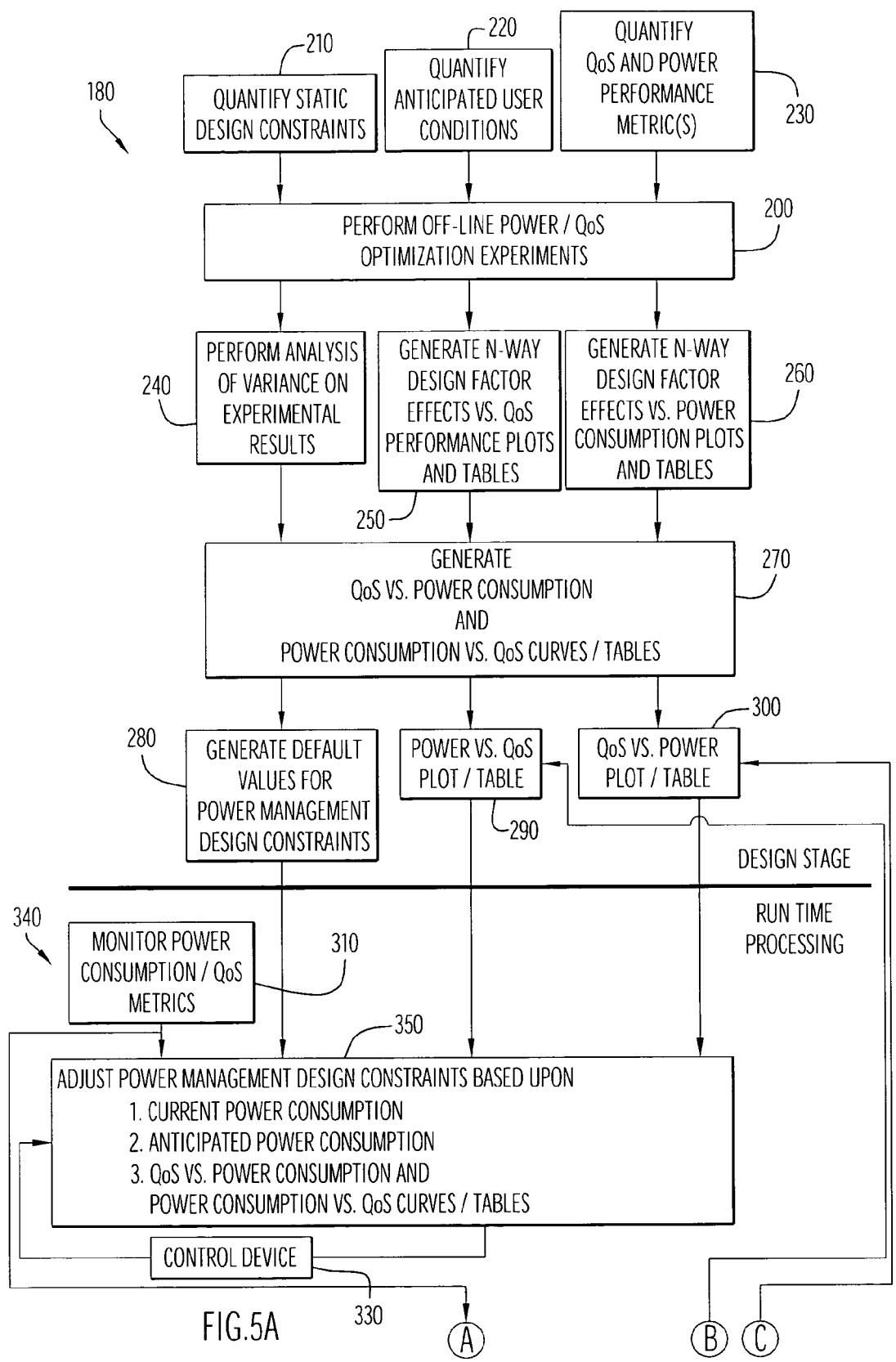
FIGS. 5A and 5B are block diagrams showing the off-line and on-line adaptive power management system of FIG. 1B, in greater detail.
Figure 5B:
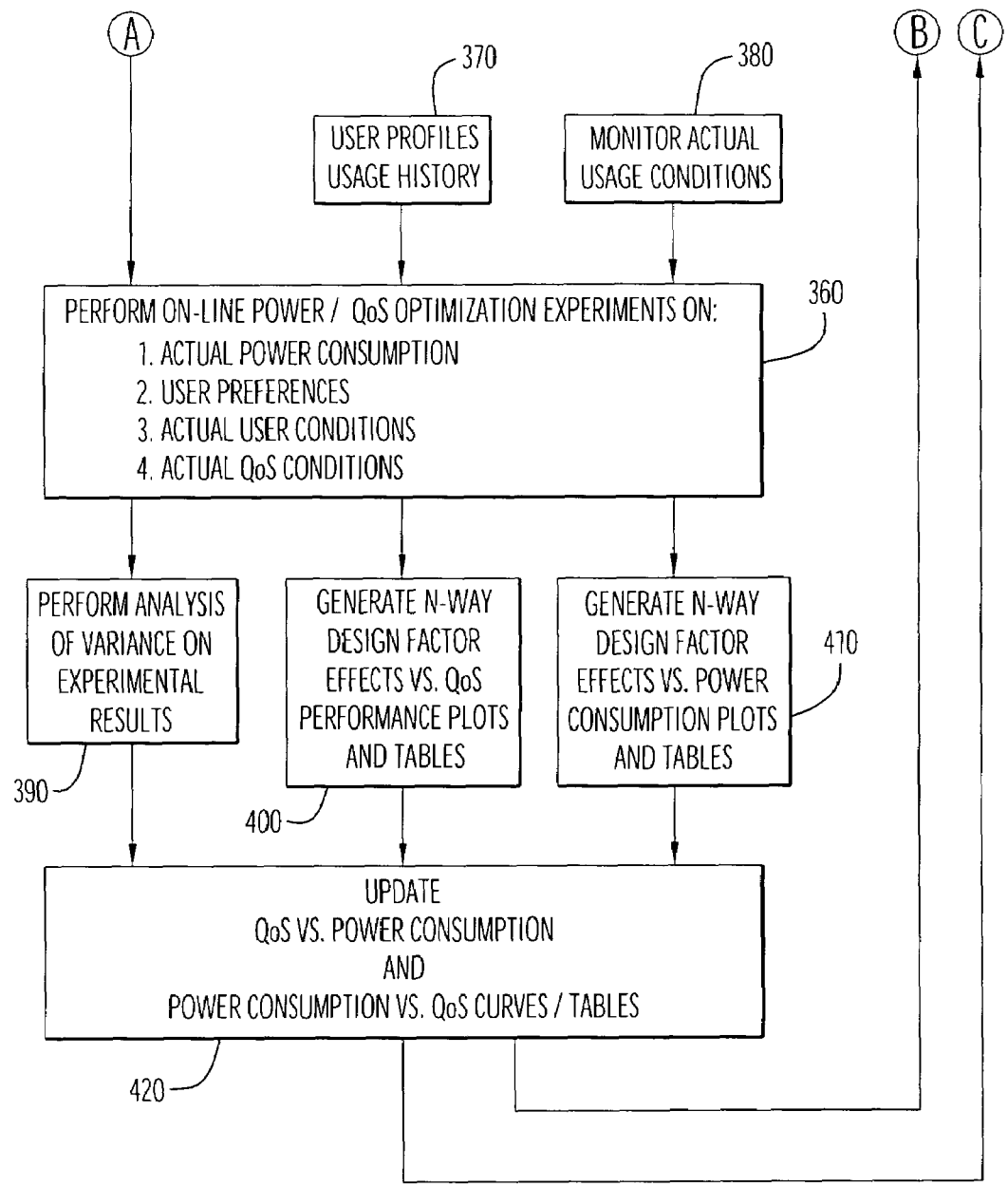

An on-line power management system is shown in FIGS. 5A and 5B. Here, much of the design stage and run time processing portions of the system are the same as with the off-line system shown in FIG. 4. However, in addition to those off-line features, features shown in FIG. 5B are added. Optimization experiments are performed in stage 360 based on the monitored power consumption and QoS metrics from stage 310. Also input to the on-line power/QoS optimization experiment stage 360 are user profiles and usage history information that is collected and stored at stage 370, and other actual usage conditions monitored at stage 380. The optimization experiments are performed, preferably at periodic intervals appropriate to the device or design. Although, the experiments can be performed on an event basis.

As with the off-line experiments, the experiment data is used to perform a variance analysis in stage 390. Also, n-way control factor effects versus QoS performance plots and/or tables are prepared at stage 400, and n-way control factor effects versus power consumption plots and/or tables are prepared at stage 410.

The variance analysis information, and plots and/or tables generated at stages 400 and 410 are supplied to stage 420. There, the QoS versus power consumption and the power consumption versus QoS curves are updated with the newly generated optimization data based on the actual operating conditions.

These updated plots and/or tables are supplied back to stages 290 and 300 where the updated plots and/or tables are used to adjust the power management control factors at stage 350.

Figure 6:
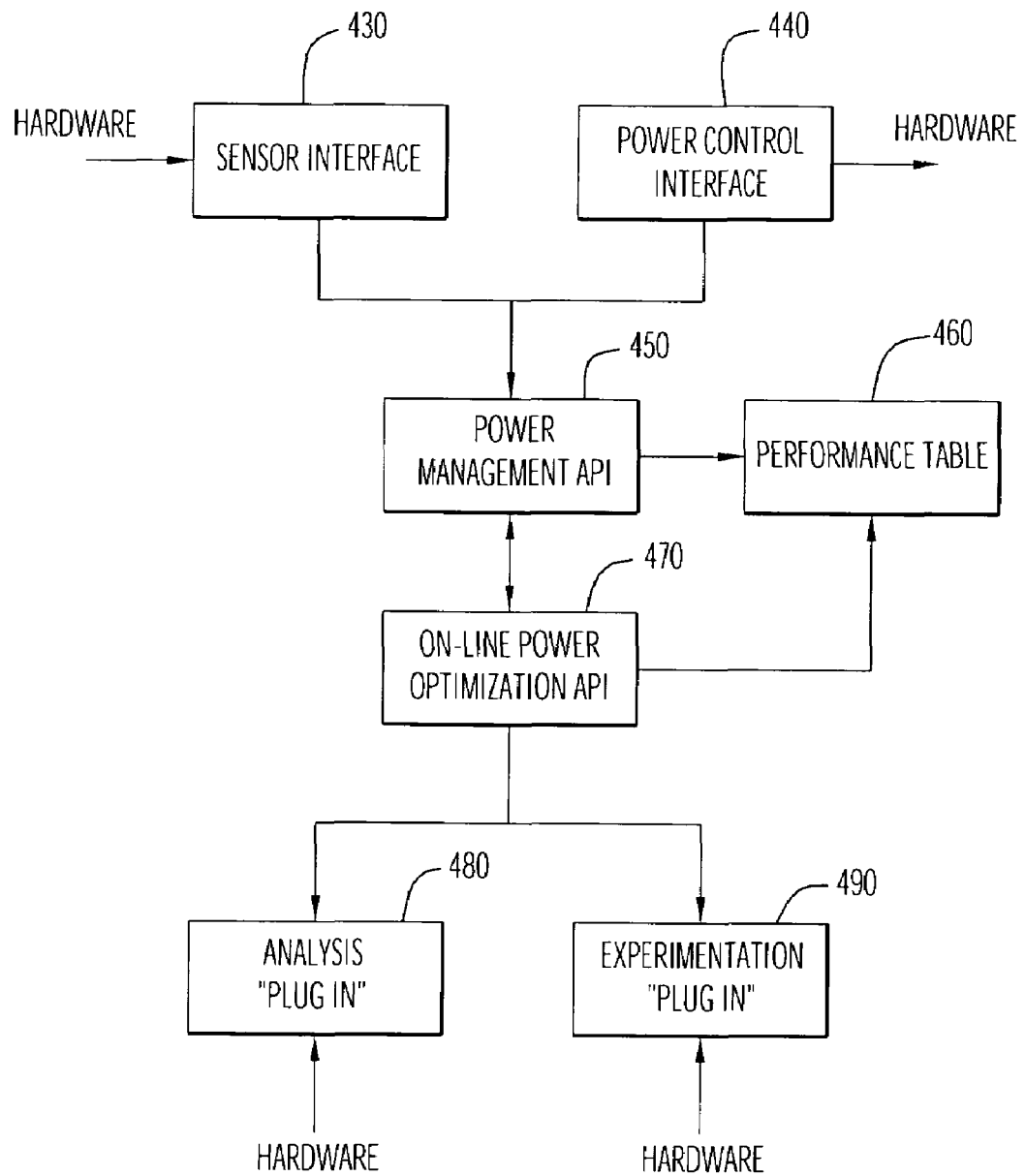
FIG. 6 shows a block diagram of a hardware system for implementing the adaptive power management systems shown in FIGS. 4, 5A and 5B.

A block diagram of a device using the power management techniques described here is shown in FIG. 6. The device includes a sensor interface 430 that receives information from hardware sensors in the device. A power control interface 440 is connected to the various subsystems within the device and operates to output control signals to those subsystem to effect the adaptive control. The sensor interface and power control interface are coupled to a power management application programming interface (API) 450. This unit provides a programming interface to a performance table storage unit 460 that holds the power consumption/QoS plots. The power management API 450 also is coupled to an on-line power optimization API 470.

The on-line power optimization API 470 provides a programming interface to various hardware analysis plug-in units for analyzing the experimental data. An experimentation plug-in unit 490 allows various conventional optimization routines to be used with the system. The on-line power optimization API takes the experiment and variance information and updates the plots and tables in the performance table 460. That updated table is used by the power management API to control the hardware through the power control interface 440 to effect the desired power management.

The power management API 450 and the power optimization API 470 include software, or program instructions, that when executed by a computer perform the adaptive management functions described here. It will be understood that those program instructions can be recorded on a variety of computer-readable media, including, but not limited to magnetic storage media, optical storage media, and electronic storage media. It will be further understood that those program instructions can be transmitted over data networks such as the Internet. Likewise, the performance table storage unit 460 can include any storage media suitable for storing and retrieving the power consumption/OoS plots, such as magnetic, optical and electronic storage media. Further, such plots can be transmitted over data networks such as the Internet.

Figure 7:
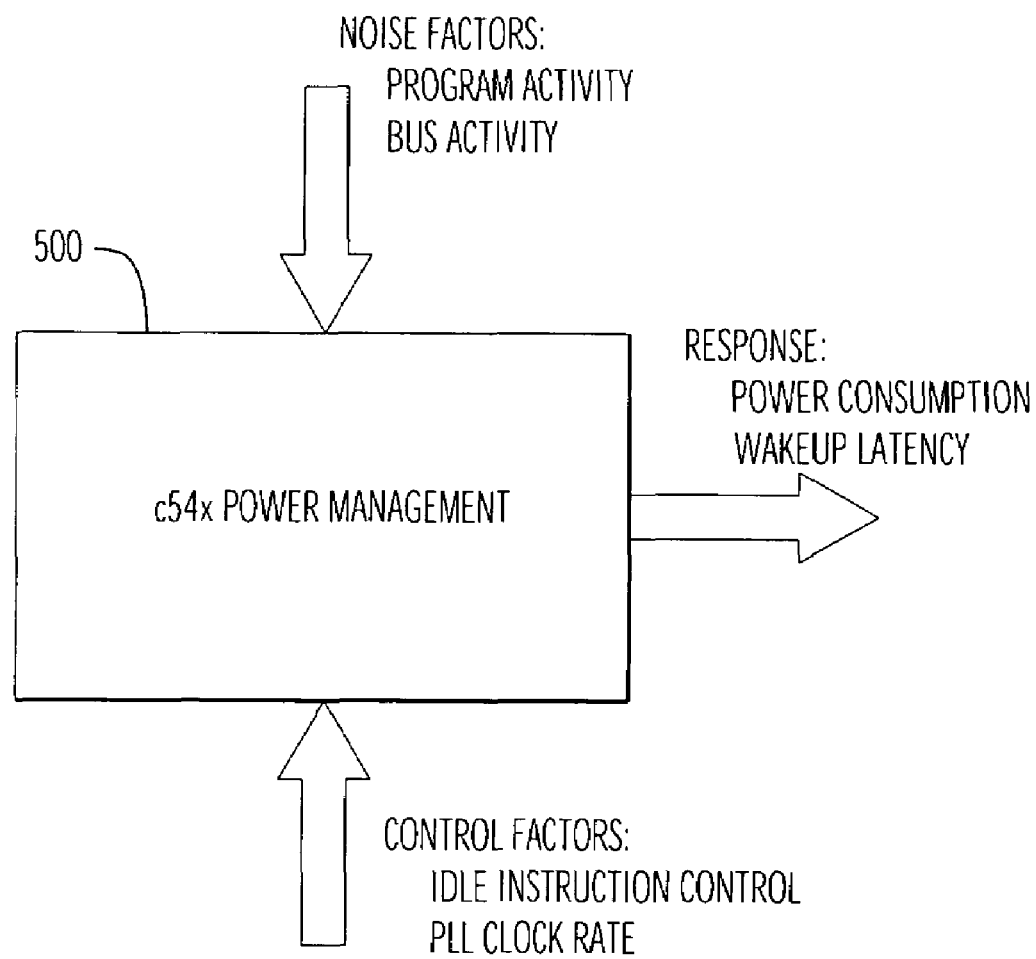
FIG. 7 is a block diagram showing a power management processor.

FIG. 7 illustrates the TMS320LC54x that can be used as a power management DSP. The power management DSP receives control factor instructions, such as the idle instruction controls and instructions regarding the PLL clock rate. Noise factors, such as program activity and bus activity within the device are monitored and supplied to the DSP. The DSP performs the experiments using the input control factors and the noise factors, and produces the results of the experiments, such as the power consumption and the wake-up latency.

Set forth below are some additional power management/control applications that can use the adaptive control techniques described here. Although the example applications described below relate mainly to mechanical/electromechanical applications, the techniques described here can be applied to virtually any computer controlled system or device that can be operated based on an individual's preferences.

Automobiles

The adaptive control techniques described here can be used to control systems in automobiles. For example, engine fuel efficiency can be monitored and settings for the automobile can be controlled using driver conditions and preferences, including the length of trip, remaining fuel, passenger comfort (e.g. heating/air conditioning), etc.

Home and Office Heating and Cooling/HVAC Systems

Through the use of various room sensors an HVAC system using the techniques described here can develop a optimal energy efficiency profile with respect to a QoS measure such as a desired comfort level. By combining measurements from a dispersed set of motion and temperature sensors the HVAC controller obtains the necessary information to optimize energy usage. This control also can be based upon other factors, such as the air humidity and the anticipated power loading to the power grid. Users who want to save money might choose to sacrifice comfort in exchange for cost savings during peak usage hours. By using an HVAC system controlled according to the techniques described here those tradeoffs can be accomplished in an automatic manner.

Lighting Systems

A lighting system can use motion sensors, such as those used in connection with the HVAC system described above, to provide an optimal lighting scenario based on individual desires. The lighting system, using the adaptive control techniques described here, adapts control of certain lights in the system by controlling the desired levels of light output for those lights with respect to, for example, time of day and room usage by the occupants.

Airline Jet Engines

An adaptive power management unit can use existing airframe sensors to optimize an airline engine's fuel efficiency. Based on speed, environment, altitude, range to touch down, the engine control system throttles and controls the engine using the techniques described here to maximize the QoS, such as the range to touch down, for example. Alternatively, if the QoS measure is passenger comfort, as might be expected for a corporate jet, the adaptive control techniques might alter altitude and speed to improve the quality of the ride.

Also, the jet engines can be controlled over heavily populated areas to minimize the noise pollution while maintaining the touch down time and passenger comfort. The controller would have information about the airplane's location due to onboard GPS equipment, for example, and would use software executing on a computerized controller to automatically minimize jet engine noise as it approached heavily populated areas. For instance, the Concorde can be controlled so that it does not reach supersonic speeds until it is located over the ocean due to the sonic booms that it creates as a result of its super-sonic speed.

Motors, Pumps, etc

Motors and pumps can be optimized to control flow with respect to energy draw. Various pump parameters can be controlled using the techniques described here to maintain laminar flow, continuous ramp up, and consistent volume. The advantage of such a system is that it is adaptable to the users' needs as opposed to being fixed for all users irrespective of any specific user's QoS requirements. Such a motor control system also can be adapted to other factors, such as rain flow. Over a heavy period of rain, it might be more important to pump the water to prevent flooding, regardless of the energy costs. The motor control system using the adaptive control techniques described here can be configured to adapt to those types of conditions.

Having described embodiments of devices, articles of manufacture and methods for adaptively controlling power management in devices, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of generating information for controlling power consumption of a device, the method comprising:
    (a) performing an off-line optimization analysis comprising optimization experiments to optimize a quality of service measure and power consumption of the device based on a plurality of control factors for controlling the device;
    (b) performing a variance analysis on results from said optimization experiments;
    (c) generating, from results of the optimization experiments, first data relating each of the plurality of control factors to the quality of service measure and second data relating each of the plurality of control factors to power consumption of the device; and
    (d) generating a power management profile relating the quality of service measure and the power consumption of the device based on results of the variance analysis, said first data and said second data.

2. The method of claim 1, wherein (a) performing comprises performing a fractional factorial style experiment.

3. The method of claim 1, wherein (a) performing comprises performing a full factorial style experiment.

4. The method of claim 1, wherein (a) performing comprises performing one of a Design of Experiments (DOE) experiment, an Orthogonal Array experiment, a Latin Square Design experiment, and a Taguchi style experiment.

5. The method of claim 1, further comprising selecting one of the plurality of control factors based on the power management profile, wherein the selected control factor is adjusted to control power consumption of the device.

6. The method of claim 5, wherein (d) generating comprises filtering results of the optimization analysis.

7. The method of claim 6, wherein selecting comprising selecting one of the plurality of control factors by using the power management profile to determine a power consumption level corresponding to a selected quality of service level, determining a result of the optimization analysis corresponding to the determined power consumption level and selected quality of service level, and determining as the selected control factor a control factor corresponding to said determined result of the optimization analysis.

8. The method of claim 6, wherein selecting comprises selecting one of the plurality of control factors by using the power management profile to determine a quality of service level corresponding to a selected power consumption level, determining a result of the optimization analysis corresponding to the determined quality of service level and selected power consumption level, and determining as the selected control factor a control factor corresponding to said determined result of the optimization analysis.

9. A method of generating information for controlling a device, the method comprising:
(a) performing an off-line optimization analysis comprising optimization experiments to optimize a quality of service measure and an operating condition of the device based on plurality of control factors for controlling the device;
(b) performing a variance analysis on results from said optimization experiments;
(c) generating, from results of the optimization experiments, first data relating each of the plurality of control factors to the quality of service measure and second data relating each of the plurality of control factors to the operating condition of the device; and
(d) generating a management profile relating the quality of service measure and the operating condition of the device based on results of the variance analysis, said first data and said second data.

10. The method of claim 9, wherein (a) performing comprises performing a fractional factorial style experiment.

11. The method of claim 9, wherein (a) performing comprises performing a full factorial style experiment.

12. The method of claim 9, wherein (a) performing comprises performing one of a Design of Experiments (DOE) experiment, an Orthogonal Array experiment, a Latin Square Design experiment, and a Taguchi style experiment.

13. The method of claim 9, further comprising selecting one of the plurality of control factors based on the management profile, wherein the selected control factor is adjusted to control the operating condition of the device.

14. The method of claim 13, wherein (d) generating comprises filtering results of the optimization analysis.

15. The method of claim 14, wherein selecting comprising selecting one of the plurality of control factors by using the management profile to determine a level of the operating condition corresponding to a selected quality of service level, determining a result of the optimization experiment corresponding to the determined level of the operating condition and selected quality of service level, and determining as the selected control factor a control factor corresponding to said determined result of the optimization analysis.

16. The method of claim 14, wherein selecting comprises selecting one of the plurality of control factors by using the management profile to determine a quality of service level corresponding to a selected operating condition level, determining a result of the optimization analysis corresponding to the determined quality of service level and selected operating condition level, and determining as the selected control factor a control factor corresponding to said determined result of the optimization analysis.

17. An apparatus suitable for adaptively controlling a system, the apparatus comprising:
an optimization unit configured to perform an off-line optimization analysis comprising optimization experiments to optimize a quality of service measure and an operating condition of the system based on a plurality of control factors for controlling the system, wherein the optimization unit performs a variance analysis on results from said optimization experiments and generates, from the results of said optimization experiments, first data relating each of the plurality of control factors to the quality of service measure and second data relating each of the plurality of control factors to the operating condition of the device;
a management unit configured to generate a management profile relating the quality of service and the operating condition of the system based on results of the variance analysis, said first data and said second data; and
a performance table storage unit configured to store the management profile generated by the management unit.

18. The apparatus of claim 17, wherein the optimization unit performs said optimization analysis based further on a user profile containing information concerning a user's preferences for operating the system.

19. The apparatus of claim 17, wherein the optimization unit performs said optimization analysis based further on a pattern of usage of the system.

20. The apparatus of claim 17, further comprising a control unit configured to adaptively control the system based on the management profile.

21. The apparatus of claim 17, wherein the control unit is configured to select one of the plurality of control factors based on the management profile to control the operating condition of the system.

22. The apparatus of claim 17, wherein said optimization unit performs said optimization analysis on power consumption of the system as said operating condition.

23. The apparatus of claim 21, wherein said control unit selects one of the plurality of control factors by using the management profile to determine a level of the operating condition corresponding to a selected quality of service level, determining a result of the optimization experiment corresponding to the determined level of the operating condition and selected quality of service level, and determining as the selected control factor a control factor corresponding to said determined result of the optimization analysis.

24. The apparatus of claim 21, wherein said control unit selects one of the plurality of control factors by using the management profile to determine a quality of service level corresponding to a selected operating level, determining a result of the optimization analysis corresponding to the determined quality of service level and selected operating level, and determining as the selected control factor a control factor corresponding to said determined result of the optimization analysis.

25. The apparatus of claim 17, wherein said optimization unit performs said optimization analysis using one of Design of Experiments (DOE) experiment, an Orthogonal Array experiment, a Latin Square Design experiment, and a Taguchi style experiment.

26. A method of controlling a system using a controller and a management profile that relates a quality of service measure for the system and an operating condition for the system, the method comprising:
- (a) monitoring aspects of the system during its operation, including the operating condition and the quality of service measure;
- (b) performing an on-line optimization analysis comprising optimization experiments based on the monitored aspects of the system during the operation of the system to optimize the quality of service measure and the operating condition based on a plurality of control factors for controlling the system;
- (c) performing a variance analysis on results from said optimization experiments;
- (d) generating, from results of said optimization experiments, first data relating each of the plurality of control factors to the quality of service measure and second data relating each of the plurality of control factors to the operating condition; and
- (e) updating the management profile based on results of the variance analysis, said first data and said second data to produce an updated management profile.

27. The method of claim 26, wherein (b) performing comprises performing the on-line optimization analysis based further on a user profile containing information concerning a user's preferences for operating the system.

28. The method of claim 26, wherein (b) performing comprises performing the on-line optimization analysis based further on a pattern of usage of the system.

29. The method of claim 26, and further comprising adaptively controlling the system based on the updated management profile.

30. The method of claim 26, and further comprising selecting one of the plurality of control factors based on the updated management profile, and controlling the operation condition of the device by adjusting the selected control factor.

31. The method of claim 30, wherein (e) updating comprises updating the management profile by filtering results of the optimization analysis.

32. The method of claim 31, wherein selecting comprises selecting one of the plurality of control factors by using the management profile to determine a level of the operating condition corresponding to a selected quality of service level, determining a result of the optimization analysis corresponding to the determined level of the operating condition and selected quality of service level, and determining as the selected control factor a control factor corresponding to said determined result of the optimization analysis.

33. The method of claim 31, wherein selecting comprises selecting one of the plurality of control factors by using the management profile to determine a quality of service level corresponding to a selected level of the operating condition, determining a result of the optimization analysis corresponding to the determined quality of service level and selected operating condition level, and determining as the selected control factor a control factor corresponding to said determined result of the optimization analysis.

34. The method of claim 26, wherein (b) performing comprises performing a fractional factorial style experiment.

35. The method of claim 26, wherein (b) performing comprises performing a full factorial style experiment.

36. The method of claim 26, wherein (b) performing comprises performing one of a Design of Experiments (DOE) experiment, an Orthogonal Array experiment, a Latin Square Design experiment, and a Taguchi style experiment.

37. The method of claim 26, wherein (a) monitoring comprises monitoring a computer-controlled electronic device.

38. The method of claim 26, wherein (a) monitoring comprises monitoring a computer-controlled mechanical device.

39. The method of claim 26, wherein (a) monitoring comprises monitoring power consumption of the system as said operating condition.

40. A computer-readable medium storing instructions suitable for controlling a system using a controller and a management profile that relates a quality of service measure for the system and an operating condition for the system, the computer-readable medium comprising:
- (a) program instructions for monitoring aspects of the system during its operation, including the operating condition and the quality of service measure;
- (b) program instructions for performing an optimization analysis comprising optimization experiments based on the monitored aspects of the system during the operation of the system to optimize the quality of service measure and the operation condition based on a plurality of control factors for controlling the system;
- (c) program instructions for performing a variance analysis on results from said optimization experiments;
- (d) program instructions for generating, from results of said optimization experiments, first data relating each of the plurality of control factors to the quality of service measure and second data relating each of the plurality of control factors to the operating condition; and
- (e) program instructions for updating the management profile based on results of the variance analysis, said first data and said second data to produce an updated management profile.

41. An apparatus suitable for adaptively controlling a system, the apparatus comprising:
- a system management unit configured to monitor aspects of the system during the operation of the system, including an operating condition and a quality of service measure;
- an on-line optimization unit configured to perform an optimization analysis comprising optimization experiments based on the monitored aspects of the system during operation of the system to optimize the quality of service measure and the operating condition based on a plurality of control factors for controlling the system, perform a variance analysis on results from said optimization experiments and generate, from results of said optimization experiments, first data relating each of the plurality of control factors to the quality of service measure and second data relating each of the plurality of control factors to the operating condition; and
- a performance table storage unit coupled to the system management unit and the on-line optimization unit and configured to store a management profile that relates the operating condition with the quality of service measure for the system and to update the management profile held in the performance table storage unit based on results of the variance analysis, said first data and said second data to produce an updated management profile.

42. The apparatus of claim 41, wherein the on-line optimization unit performs the optimization analysis based further on a user profile containing information concerning a user's preferences for operating the system.

43. The apparatus of claim 41, wherein the on-line optimization unit performs the optimization analysis based further on a pattern of usage of the system.

44. The apparatus of claim 41, further comprising a control unit configured to adaptively control the system based on the updated management profile.

45. The apparatus of claim 44, wherein the control unit selects one of the plurality of control factors based on the management profile, and adjusts the selected control factor to control the operating condition of the system.

46. The apparatus of claim 41, wherein said system management unit monitors power consumption of the system as said operating condition.

* * * * *